Inventor
Frank J. Smith
By Soans, Pond + Anderson
Attorneys

Inventor
Frank J. Smith
By Soans, Pond & Anderson
Attorneys

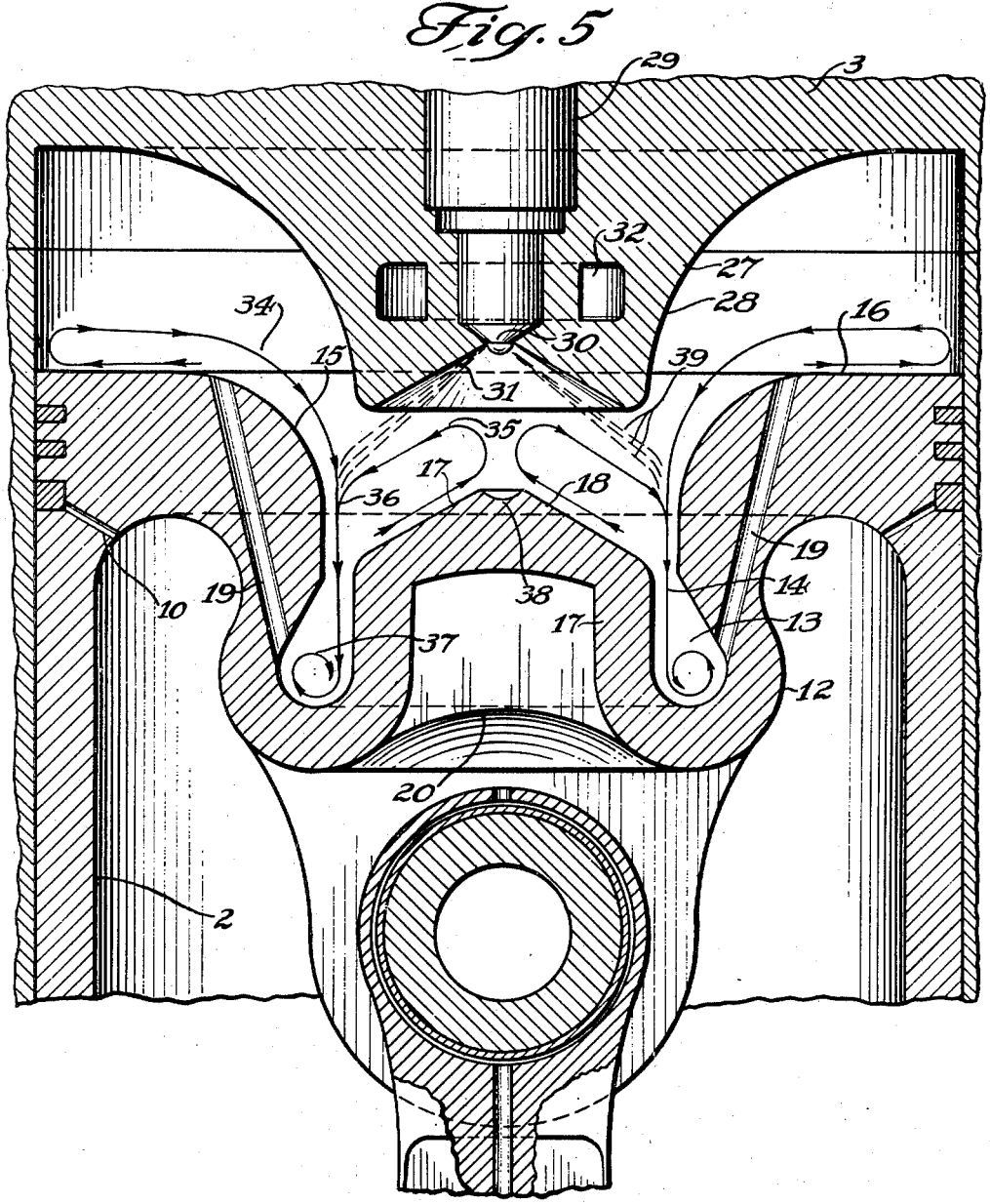

Patented May 2, 1950

2,505,999

UNITED STATES PATENT OFFICE 2,505,999

DIESEL ENGINE FOR AIRCRAFT

Frank J. Smith, Chicago, Ill.

Application September 22, 1944, Serial No. 555,213

5 Claims. (Cl. 123—32)

This invention relates to improvements in Diesel engines, particularly designed and adaptable for aircraft use although, of course, being also adapted to use wherever a Diesel engine is desired.

The main objects of the invention are to provide a lightweight Diesel engine which will produce much greater power per pound of weight than has heretofore been obtainable with Diesel engines, whether made of light or heavy metals; and to provide means whereby the heating effect of the burning fuel and the hot burnt gas will be effectively controlled so as to prevent excessive expansion and contraction of the engine parts and so as to prevent scoring or burning of the cylinder and piston walls and other normally affected parts.

Other objects and advantages of the invention will be understood by reference to the following specification and accompanying drawings (three sheets) wherein there is illustrated a portion of a Diesel engine embodying my improved construction.

In the drawings:

Fig. 5 is a section corresponding to a portion of Fig. 1 but on a much larger scale and showing a changed position.

Figure 1:
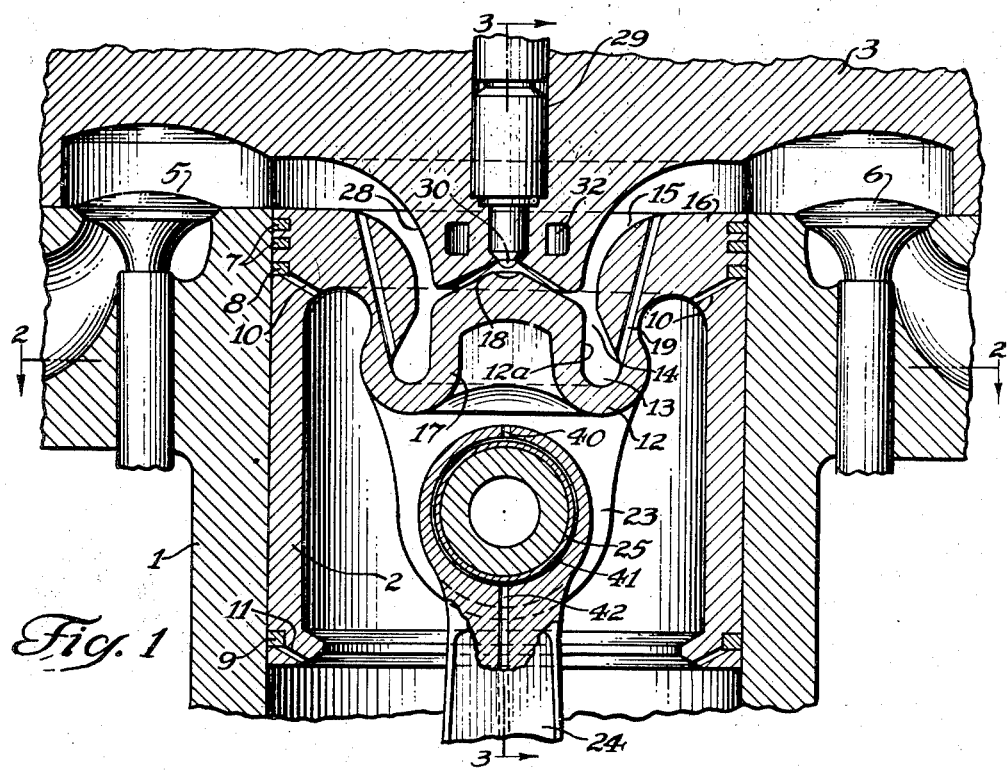
Fig. 1 is a cross-section through the upper portion of the cylinder and the adjacent portion of the cylinder head of a T-head engine, the section being taken in a plane extending through the center of the piston.
Figure 2:
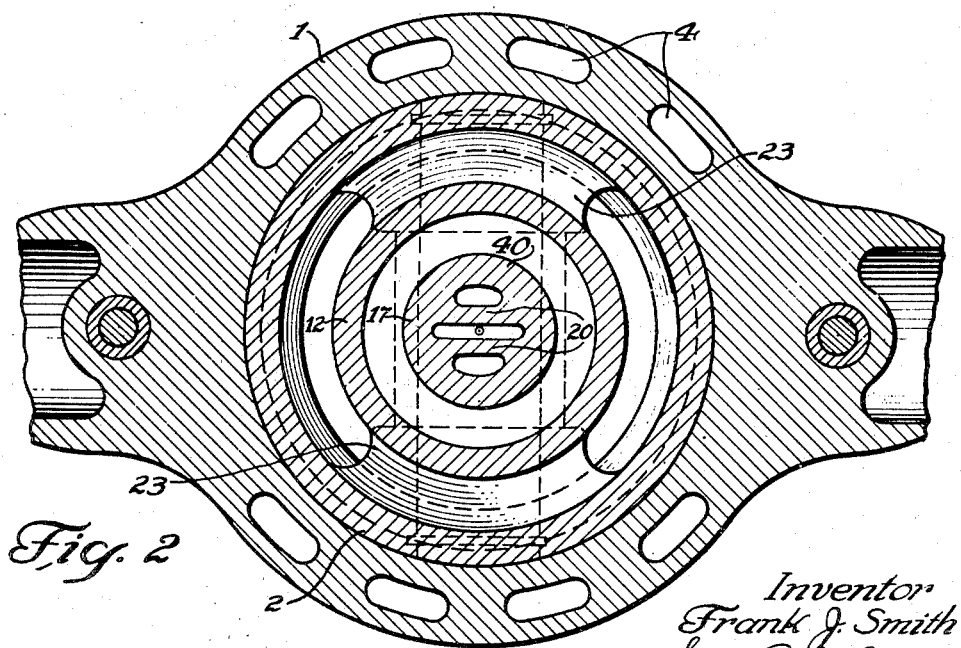
Fig. 2 is a plan section on the line 2—2 of Fig. 1.

In the drawings, one cylinder of a multi-cylinder, four-cycle Diesel engine is represented at 1, and a piston reciprocable in the cylinder is shown at 2, a cylinder head being designated 3. The piston 2 and the cylinder head 3 are made of any suitable aluminum magnesium or other lightweight metal or metal alloy, a number of which have been developed and are well known as adaptable to internal compression engine uses.

Such alloys have not heretofore been found satisfactory, and have not been considered practicable, for use in Diesel engines because of their inability to stand up under the higher temperatures encountered in Diesel engine operation but by the construction herein disclosed, the heating effect is so controlled as to make the use of these metals entirely practicable, whereby a Diesel engine may now be made much lighter in weight per horsepower, with the important advantages thereby gained.

The cylinder 1 may be made of cast iron, steel or other metals in accordance with conventional practice. The cylinder head is bolted in place on the cylinder or engine block as usual, such fastening means being not herein shown. In this instance, the cylinder 1 is provided with passageways 4 for water cooling purposes but it may be formed with fins for air cooling purposes if desired. Intake and exhaust valves 5 and 6 are provided on opposite sides of the cylinder, the same being suitably operated by the usual means in properly timed relation to the movement of the piston.

The piston is provided in this instance with a pair of compression rings 7 and an oil wiper ring 8 near the head end, and with another ring 9 near its lower or open end. The groove for the ring 8 communicates with the interior of the piston by means of a series of holes, such as indicated at 10, which are spaced uniformly around the circumference of the piston, there being, for example, twenty-four such holes in uniformly spaced relationship. The ring groove for the ring 9 similarly is provided with a series of communicating holes 11 for draining excess lubricant back into the crank case.

The head end of the piston is provided with a downwardly or inwardly projected part 12, which is spaced around its entire circumference from the inside of the side wall of the piston. Said inwardly projected part 12 is so formed as to provide a circular combustion chamber 13, which communicates with the space above the piston through a relatively narrow passageway 14, the passageway 14 being connected to the compression chamber 13 by a gradually tapering area as shown. Above the passageway 14 there is formed a central recess, the outer wall of which is convexly rounded, as shown at 15, to join gradually and smoothly with the upper end 16 of the piston.

The central upwardly extending portion 17 of the piston part 12 is of cylindrical form and it has a conical outer or upper end 18. A series of scavenger holes 19 are drilled in the piston, there being, for example, twelve such holes spaced uniformly around the piston. Within the hollow, cylindrical central portion of the piston there are provided two or more ribs indicated at 20 (Figs. 3 and 4) for strengthening and other purposes, which hereinafter will be explained.

The usual piston or wrist-pin 21 has its opposite end portions journaled in bearings 22—22 formed in internal bosses or lugs 23, which are diametrically opposed to each other and integrally joined at their inner ends, with the central portion 12 of the piston. The usual connecting rod 24 engages the central portion of the wrist-pin 21 intermediate the bosses 23—23, a suitable bushing 25 being provided between the connecting rod and wrist-pin. The wrist-pin is provided with suitable end caps 26—26 and the wrist-pin is preferably of the floating type.

The cylinder head 3 is provided with a central portion 27 which projects downwardly into the upper end of the cylinder 1 and into the central hollow of the piston when the latter is at the upper end of its stroke. Said portion 27 of the cylinder head is somewhat smaller in diameter at all points than the corresponding diameter of the portion of the piston recess into which said cylinder head portion 27 projects. The surface 28 of said cylinder head portion 27 cooperates with the surface 15 of the piston to form a slightly upwardly and outwardly flaring or an inwardly and downwardly extending, gradually constricted circular passageway when the piston is at the upper end of its stroke.

A fuel injection nozzle 29 is seated in the central portion of the cylinder head so that its discharge end 30 projects slightly into the concave conical bottom surface 31 of the cylinder head portion 27. Said concave conical surface 31 cooperates with the conical surface 17 of the piston to form a very narrow passageway, this passageway being the most restricted part of the spacing between the upper end of the piston and the lower face of the cylinder head when the piston is at the upper limit of its stroke. The injection nozzle 29 is represented as of the American Bosch orifice type but any other suitable injection nozzle may be employed. To prevent overheating of the discharge end of the injection nozzle, a water-cooling passageway 32 is provided in the cylinder head around the lower end of the injection nozzle, said passageway communicating through channels such as indicated at 33 with the water-cooling passageways 4 in the cylinder walls.

In the operation of the described structure, fuel is injected preferably starting at about 11 degrees before top center position of the crank shaft is reached and closed at about 3 degrees before top center position is reached. During the latter part of the compression stroke, air currents are produced which more or less follow the surface 15 of the piston downwardly and inwardly into the combustion chamber 13, this being due to the inwardly and downwardly converging form of the space between the cylinder head and the piston. Such air current is joined by another air current which flows downwardly and outwardly between the surfaces 18 and 31 of the piston and cylinder head respectively. Such air flow is represented by the arrowed lines 34 and 35 (Fig. 5) which join each other approximately as indicated at 36. The fuel spray delivered by the injection nozzle 29 is directed into the bight between the joining currents 34 and 35 and is thereby effectively distributed so as to provide the required combustible mixture. The mixture is further improved incident to the turbulence of the mixture resulting from the joining of the air currents and fuel spray as already explained and by the swirling or turbulent motion imparted to the mixture in the combustion chamber 13 as indicated by the circular air flow lines 37.

Figure 3:
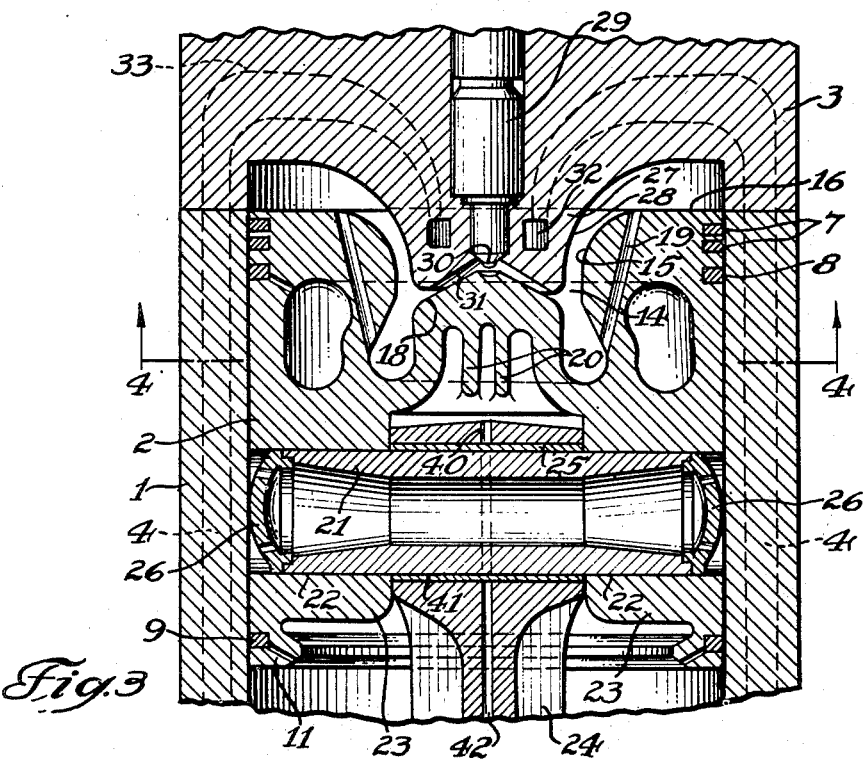
Fig. 3 is a vertical section on the line 3—3 of Fig. 1.
Figure 4:
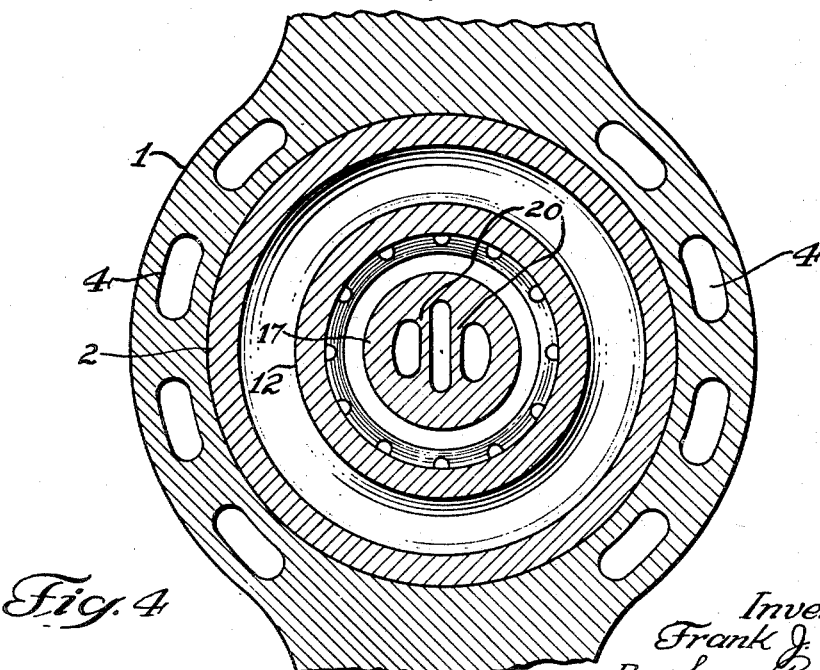
Fig. 4 is a horizontal section on the line 4—4 of Fig. 3.

In Fig. 5, the piston is shown approximately full size and in a position approaching the top of its stroke. At the top of the piston stroke, the space between the conical surface 18 of the piston and the surface 31 of the cylinder head will be relatively small as represented in Fig. 3 wherein the width of the space is somewhat enlarged for illustration purposes. The apex of the conical surface 18 of the piston is slightly recessed as shown at 38 so as to adequately clear the tip of the injection nozzle 29.

The approximate course of the injected fuel spray is indicated by the dash lines 39 (Fig. 5). The fuel is preferably injected under a pressure which is not in excess of the compression pressure or, at least, which is no greater than the pressure required to cause penetration of the fuel to the extent indicated. Because of the effective mixing of the compressed air and the fuel and the effective air turbulence produced, atomization of the fuel spray to the highest degree is not essential although it is, of course, desirable. The high air turbulence obtained by the described arrangement so effectively aids in distribution of the fuel that some sacrifice of atomization and injection pressure may be tolerated without material disadvantage. It may be observed that it is desirable that the pressure of the fuel spray be not so great as to cause the fuel to be deposited on the walls of the piston towards which it is directed. The oil penetration should be only sufficient to cause the atomized oil to reach the bight between the merging air currents which will effectively complete the atomization of the fuel and mixing thereof with the compressed air.

Because of the very narrow space provided between the surfaces 18 and 31 at the top of the stroke of the piston, there is developed an effective flow of the compressed air and fuel mixture away from the injection nozzle tip so that there is no tendency for the combustible fuel to accumulate at the nozzle tip; in other words, there is no dead air pocket at the end of the injection nozzle which would tend to produce carbonization of the nozzle tip and plugging of the same. In the arrangement shown, the tip is automatically kept clean because of the outward air flow developed.

Upon burning of the combustible air and fuel mixture in the combustion chamber 13, the expansive pressure of the burnt gas is directed upwardly out of the combustion chamber 13 and against the cylinder head. It will be observed that the expanding gas pressure flows upwardly from the top of the piston in the form of a cylindrical tube corresponding substantially to the circular passageway 14 so that there is uniformity of pressure exerted at all points of the piston with the result that there is a reduction, if not a complete elimination, of side thrust on the piston because of unbalanced pressure on the end of the piston. Upon the exhaust stroke of the piston, the expanded gas is forced into the firing chamber in a manner similar to that in which the air and fuel mixture is compressed but the scavenging ducts 19 provide an escape passageway for the spent gases, so that complete scavenging of the combustion chamber and the compression chamber between the piston and cylinder head is obtained preparatory to the next cycle of operation. The scavenging ducts 19 permit the escape of some portion of the expansive gas pressure from the combustion chamber on the power stroke but this does not detract from the total power produced.

On the succeeding air intake stroke, fresh air fills the cylinder area above the piston and the combustion chamber in the piston.

Combustion occurs in the ring-like combustion chamber 13 and is thereby kept away from the walls of the piston and cylinder thereby avoiding burning of the lubricating oils on the cylinder walls and the creation of carbon. The carbon-free condition and the improved or preserved lubrication thus obtained, reduces wear on the cylinder and piston walls, and eliminates scoring and sticking of the piston whereby frequent shutdowns and overhauling are made unnecessary. Also, compression is thereby more adequately maintained than in conventional Diesel and other engine constructions. Also, it should be observed that combustion takes place very rapidly because the effective mixture of the fuel with air is substantially completed during the direct injection period. Hence ample time is afforded in the engine operation to take full advantage of the expansive force of the burned fuel oil air mixture.

The center portion of the piston is effectively cooled by means of an oil spray which is directed against the vanes or ribs 20 from a hole 40 in the upper end of the piston rod, said hole 40 communicating with an oil channel 41 provided in the wrist-pin bushing 25. Oil is delivered under pressure to the channel 40 in the wrist-pin bushing through an oil passageway 42 provided in the connecting rod. The oil thus sprayed on the ribs 20 and on the inside surface of the central dome of the piston serves to carry away the heat developed incident to the operation of the engine so that the piston is not subjected to excessive heat whereby the lightweight aluminum, magnesium, and other alloys may safely be used. The oil sprayed on the inside of the piston dome drips back into the crank case.

In the description, reference is made to a T-head engine but it will be apparent that the described piston and cylinder head details may be employed in other forms of engines such as typified by L and F head engines.

Various changes in the structure may be made while retaining the principles of the invention.

I claim:

1. A Diesel engine comprising a piston having its head end provided with a reentrant axial portion, said reentrant portion having an annular outwardly facing combustion chamber therein and a central dome-like part embodying a cylindrical outer wall and a conical top wall, said cylindrical outside wall constituting a portion of the wall of said annular combustion chamber and said conical top portion being spaced downwardly from the normal top plane of the piston so as to provide a central recess in said piston, and a cylinder head provided with a central depending portion adapted to enter said central recess of the piston, the bottom wall of said central head portion approximately conforming to the conical top surface of the piston central portion, said cylinder head having an opening therein communicating with bottom of said central depending portion for receiving a fuel injecting nozzle.

2. A Diesel engine comprising a piston having its head end provided with a reentrant axial portion, said reentrant portion having an annular outwardly facing combustion chamber therein and a central dome-like part embodying a cylindrical outer wall and a conical top wall, said cylindrical outside wall constituting a portion of the wall of said annular combustion chamber and said conical top portion being spaced downwardly from the normal top plane of the piston so as to provide a central recess in said piston, and a cylinder head provided with a central depending portion adapted to enter said central recess of the piston, the bottom wall of said central head portion approximately conforming to the conical top surface of the piston central portion, said piston being also provided with a plurality of scavenging holes extending from said combustion chamber upwardly to the top of the piston and outwardly of said central piston recess.

3. In a Diesel engine, a piston and a cylinder head, said cylinder head and piston having axially disposed approximately conforming portions including a depending projection on the cylinder head and a recess in the piston, said piston being provided below such recess with an annular combustion chamber communicating with said recess so as to permit a compressed air and fuel mixture to enter and be burned in said chamber, the piston being also provided with a series of circumferentially arranged, relatively spaced, scavenging holes, communicating at its opposite ends with said combustion chamber and the cylinder space above said piston.

4. In a Diesel engine, a piston and a cylinder head, said cylinder head and piston having axially disposed portions including a depending projection on the cylinder head and a recess in the piston, said depending projection being of circular form and tapering downwardly in diameter from the cylinder head to its lower end and said piston recess being also of circular form and having adjacent its bottom, an internal diameter which is larger than the diameter of the lower end of said cylinder head projection, the diameter of said recess being gradually increased upwardly at a greater rate than the diameter of said cylinder head projection, thereby providing, when the piston is at the top of its stroke, an annular space which gradually tapers inwardly and downwardly, said piston being provided below such recess with an annular combustion chamber communicating with the bottom of said annular space so as to permit a compressed air and fuel mixture to enter and be burned in said chamber, the piston being also provided with a series of circumferentially arranged, relatively spaced, scavenging holes, communicating at its opposite ends with said combustion chamber and the cylinder space above said piston.

5. In a Diesel engine, a piston and a cylinder head, said cylinder head and piston having axially disposed portions including a depending projection on the cylinder head and a recess in the piston, said depending projection being of circular form and tapering downwardly in diameter from the cylinder head to its lower end and said piston recess being also of circular form and having adjacent its bottom, an internal diameter which is larger than the diameter of the lower end of said cylinder head projection, the diameter of said recess being gradually increased upwardly at a greater rate than the diameter of said cylinder head projection, thereby providing, when the piston is at the top of its stroke, an annular space which gradually tapers inwardly and downwardly, and said piston being provided below such recess with an annular combustion chamber communicating with the bottom of said annular space so as to permit a compressed air and fuel mixture to enter and be burned in said chamber.

FRANK J. SMITH.

REFERENCES CITED

The following references are of record in the file of this patent:

UNITED STATES PATENTS

| Number | Name | Date |
|---|---|---|
| 1,671,504 | Barrett | May 29, 1928 |
| 1,759,162 | Lang | May 20, 1930 |
| 2,046,196 | Truxell | June 30, 1936 |
| 2,067,278 | Nelson | Jan. 12, 1937 |
| 2,092,599 | Brill | Sept. 7, 1937 |
| 2,109,735 | Rosen | Mar. 1, 1938 |
| 2,118,319 | Maynard | May 24, 1938 |
| 2,151,218 | Lutz | Mar. 21, 1939 |
| 2,198,689 | Wills | Apr. 30, 1940 |
| 2,206,322 | Huesby | July 2, 1940 |
| 2,243,263 | Starr | May 27, 1941 |
| 2,256,776 | Kammer | Sept. 23, 1941 |

FOREIGN PATENTS

| Number | Country | Date |
|---|---|---|
| 491,737 | Germany | Dec. 31, 1926 |